(12) United States Patent
Chang et al.

(10) Patent No.: US 9,748,796 B2
(45) Date of Patent: Aug. 29, 2017

(54) MULTI-PORT ENERGY STORAGE SYSTEM AND CONTROL METHOD THEREOF

(71) Applicant: Ablerex Electronics Co., Ltd., New Taipei (TW)

(72) Inventors: Yao-Jen Chang, New Taipei (TW); Chia-Hung Lee, New Taipei (TW)

(73) Assignee: Ablerex Electronics Co., Ltd., New Taipei (TW)

( * ) Notice: Subject to any disclaimer, the term of this patent is extended or adjusted under 35 U.S.C. 154(b) by 440 days.

(21) Appl. No.: 14/326,512

(22) Filed: Jul. 9, 2014

(65) Prior Publication Data

US 2015/0015068 A1   Jan. 15, 2015

(30) Foreign Application Priority Data

Jul. 9, 2013  (TW) .............................. 102124502 A (51) Int. Cl.
*H02J 9/00* (2006.01)
*H02J 9/06* (2006.01)
*H02M 7/04* (2006.01)

(52) U.S. Cl.
CPC ................ *H02J 9/00* (2013.01); *H02J 9/062* (2013.01); *H02M 7/04* (2013.01); *Y02B 10/72* (2013.01); *Y10T 307/336* (2015.04)

(58) Field of Classification Search
CPC ......... H02J 9/062; H02J 9/00; Y10T 307/336; Y02B 10/72; H02M 7/04
See application file for complete search history.

(56) References Cited

U.S. PATENT DOCUMENTS

| 7,652,393 B2 * | 1/2010 | Moth ...................... H02J 9/062 |
| | | 307/64 |
| 7,911,187 B2 | 3/2011 | Lai et al. |
| 9,293,945 B2 * | 3/2016 | Song ......................... H02J 4/00 |
| 2010/0327806 A1 | 12/2010 | Brisebois |
| 2011/0296218 A1 | 12/2011 | Kim et al. |

* cited by examiner

*Primary Examiner* — Jared Fureman
*Assistant Examiner* — Rafael Pacheco
(74) *Attorney, Agent, or Firm* — Alan D. Kamrath; Kamrath IP Lawfirm, P.A.

(57) ABSTRACT

A multi-port energy storage system includes a bi-directional power conversion circuit, a DC-AC inverter circuit, an electric energy storage facility, a first AC port, a second AC port and an AC switch. The multi-port energy storage system controllably provides various classifications of power supply quality via the first AC port and the second AC port.

20 Claims, 8 Drawing Sheets

Prior-art
FIG. 1

Prior-art
FIG. 2

Prior-art
FIG. 3

MULTI-PORT ENERGY STORAGE SYSTEM AND CONTROL METHOD THEREOF

BACKGROUND OF THE INVENTION

1. Field of the Invention

The present invention relates to a multi-port energy storage system (ESS) and a control method thereof. More particularly, the present invention relates to the double-port or multi-port energy storage system and the control method thereof.

2. Description of the Related Art

Figure 1:
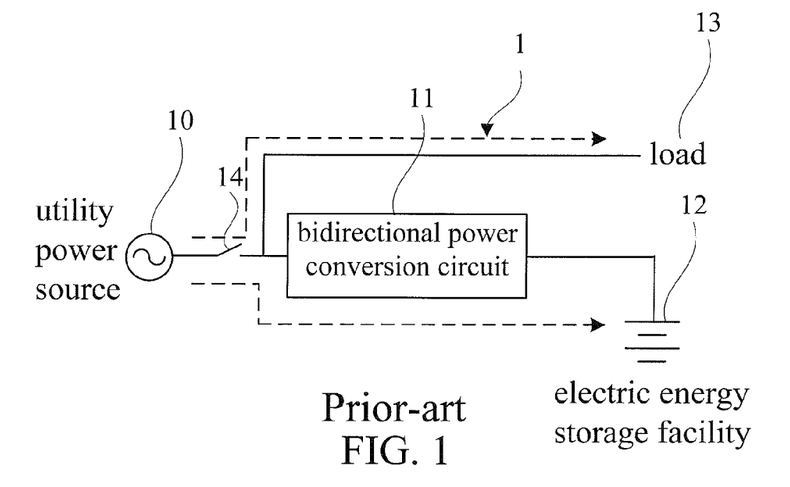
FIG. 1 is a schematic block diagram of a conventional energy storage system operated in a power storage state.

FIG. 1 shows a schematic block diagram of a conventional energy storage system operated in a power storage state. Referring initially to FIG. 1, the conventional energy storage system 1 mainly includes a bidirectional power conversion circuit 11 and an electric energy storage facility 12. The bidirectional power conversion circuit 11 has an AC side and a DC side. The AC side of the bidirectional power conversion circuit 11 connects with a utility power source 10 via an AC switch 14 while the DC side of the bidirectional power conversion circuit 11 connects with the electric energy storage facility 12. The AC side of the bidirectional power conversion circuit 11 further connects with a load 13.

Still referring to FIG. 1, when the utility power source 10 stays within its normal tolerance and is in an off-peak time period, for example, for an electric energy rate, the AC switch 14 is selectively switched on as a close state. Accordingly, an AC power supplied from the utility power source 10 is converted into a DC power by the bidirectional power conversion circuit 11, and the DC power is stored in the electric energy storage facility 12, as best shown in a lower dotted line and a directional arrow thereof in FIG. 1. The electric energy storage facility 12 comprises several batteries or DC power sources. The utility power source 10 does not further supply the AC power or any charging energy when the electric energy storage facility 12 is completely charged. In addition, the utility power source 10 will selectively supply the AC power into the load 13, as best shown in an upper dotted line and a directional arrow thereof in FIG. 1.

Figure 2:
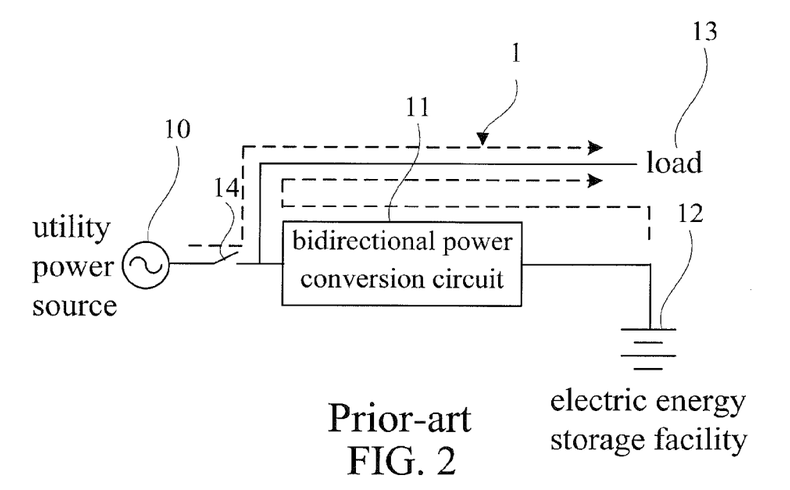
FIG. 2 is a schematic block diagram of the conventional energy storage system operated in a power release state when the utility power stays within its normal tolerance.

FIG. 2 shows a schematic block diagram of the conventional energy storage system, which corresponds to that in FIG. 1, operated in a power release state when the utility power stays within its normal tolerance. Referring to FIG. 2, when the utility power source 10 stays within its normal tolerance but is in a peak time period, the AC switch 14 is selectively switched on as a close state. The utility power source 10 selectively supplies the AC power into the load 13, as best shown in an upper dotted line and a directional arrow thereof in FIG. 2. In addition, the electric energy storage facility 12 of the conventional energy storage system is changed into the power release state, and a DC power of the electric energy storage facility 12 is converted into an AC power supplying to the load 13 via the bidirectional power conversion circuit 11, as best shown in a lower dotted line and a directional arrow thereof in FIG. 2. Accordingly, the electric energy storage facility 12, which stores electric energy during the off-peak time period, accomplishes supplying the power to the load 13 as a part of power consumption at the load 13.

Figure 3:
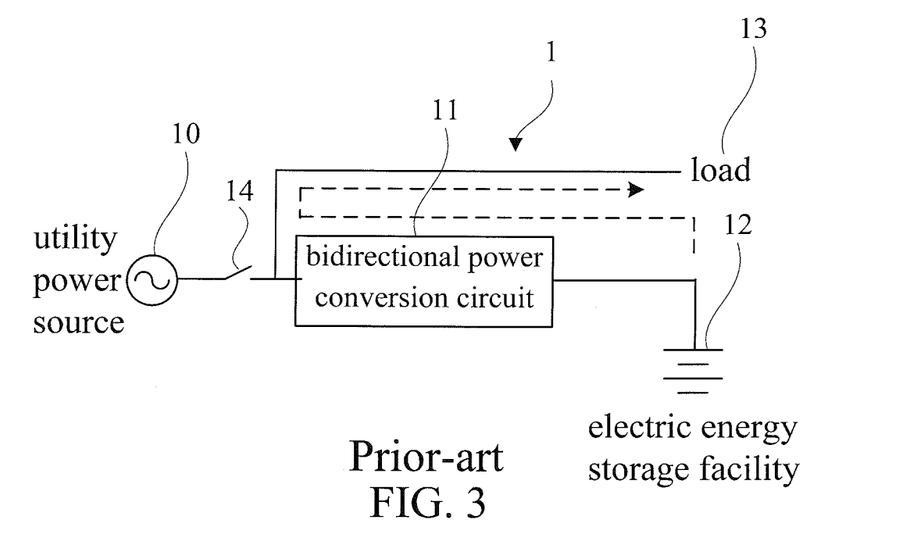
FIG. 3 is a schematic block diagram of the conventional energy storage system operated in another power release state when the utility power is out of tolerance or is in failure.

FIG. 3 shows a schematic block diagram of the conventional energy storage system operated in another power release state, which corresponds to that in FIG. 2. Referring to FIG. 3, when the utility power source 10 is out of tolerance or is in failure, the AC switch 14 is selectively switched off as an open state to disconnect with the utility power source 10. The electric energy storage facility 12 of the conventional energy storage system is still operated in the power release state, and the DC power of the electric energy storage facility 12 is still converted into the AC power supplying to the load 13 via the bidirectional power conversion circuit 11, as best shown in a dotted line and a directional arrow thereof in FIG. 3. Accordingly, the electric energy storage facility 12 supplies the entire power requirement to the load 13.

For example, U.S. Pat. No. 7,911,187 entitled "Energy Storage System", discloses an energy storage system including a battery charger and energy storage devices. The battery charger is connected to a DC/AC current source. The energy storage devices are coupled between the battery charger and the subsystems respectively. Each of the energy storage devices includes a magnetic capacitor (MCAP) and an over current protection device (OCPD). The MCAPs are charged by the battery charger and supply the electric power to the subsystems connected the energy storage devices. OCPDs detect current from the MCAPs to the subsystems and protect the subsystems from excessive currents of voltages.

Another U.S. Patent Application Publication No. 20100327806 entitled "Monitoring Cells in Energy Storage System", discloses a system for monitoring an energy storage system composed of multiple cells connected in series and having a chain of monitors including at least first and second monitors. The first monitor is configured for monitoring at least a first cell in the energy storage system to produce first monitored data. The second monitor is configured for monitoring at least a second cell in the energy storage system to produce second monitored data. The first monitor is further configured for transferring the first monitored data to the second monitor for delivery to a controller.

Another U.S. Patent Application Publication No. 20110296218 entitled "Battery Management System, Method of Controlling the Same, and Energy Storage System Including the Battery Management System", discloses a battery management system (BMS), a method of controlling the same, and an energy storage system including the battery management system. The BMS may reduce costs by stably supplying power to an insulating unit in a power-saving mode even when an isolator does not have a built-in direct current (DC)-DC converter.

However, the conventional energy storage system only provides a single AC port and a single function thereof, and it fails to provide multiple AC ports and multiple functions thereof. Disadvantageously, the functions and operations of the conventional energy storage system are limited and inflexible. The above-mentioned patents and publications are incorporated herein by reference for purposes including, but not limited to, indicating the background of the present invention and illustrating the situation of the art.

As is described in greater detail below, the present invention provides a multi-port energy storage system and a control method thereof. A first AC port and a second AC port are arranged in the energy storage system to form multiple AC ports for supplying the stored power. A first power quality (e.g. voltage or frequency) supplied at the first AC port depends on that of a utility power source, and a second power quality supplied at the second AC port is independent from the utility power source. Thus, the multi-port energy storage system is capable of supplying various levels (or classifications) of power quality via the first AC port and the second AC port. Advantageously, the multi-port energy storage system of the present invention is successful in flexibly supplying various levels (or classifications) of power quality. In addition, the multi-port energy storage system of the present invention provided with two or more AC ports supplies various levels of power quality without installing several conventional single-port energy storage systems. Advantageously, the present invention successfully simplifies the entire structure of a multi-port energy storage system.

SUMMARY OF THE INVENTION

The primary objective of this invention is to provide a multi-port energy storage system and a control method thereof. A first AC port and a second AC port are arranged in the energy storage system to form two AC ports, and a bidirectional power conversion circuit and a DC-AC inverter circuit are applied to supply a power stored in an electric energy storage facility via the first AC port and the second AC port. The first AC port supplies a first power quality depending on that of a utility power source, while the second AC port supplies a second power quality which is clean and stable or different from voltages, frequencies or waveforms of DU the utility power source. Advantageously, the multi-port energy storage system of the present invention is successful in flexibly supplying various levels (or classifications) of power quality and simplifying the entire structure of the system.

The multi-port energy storage system in accordance with an aspect of the present invention includes:

a bidirectional power conversion circuit including an AC side and a DC side;

a DC-AC inverter circuit including a DC side and an AC side;

an electric energy storage facility connecting between the DC side of the bidirectional power conversion circuit and the DC side of the DC-AC inverter circuit;

a first AC port connecting with the AC side of the bidirectional power conversion circuit;

a second AC port connecting with the AC side of the DC-AC inverter circuit; and an AC switch including a first side connecting with a utility power source or an AC power source and a second side connecting with the AC side of the bidirectional power conversion circuit;

wherein when the utility power source or the AC power source stays within a normal tolerance, the AC switch is selectively switched on as a close state allowing the utility power source or the AC power source to directly supply an AC power to the first AC port and further to directly supply the AC power to the AC side of the bidirectional power conversion circuit, such that the bidirectional power conversion circuit converts the AC power of the utility power source or the AC power source into a DC power to charge the electric energy storage facility, and the DC power is further converted into an AC power by the DC-AC inverter circuit to supply to the second AC port;

or, when the utility power source or the AC power source stays within the normal tolerance, the AC switch is selectively switched on as a close state allowing the utility power source or the AC power source to directly supply the AC power to the first AC port while the bidirectional power conversion circuit converts the DC power stored in the electric energy storage facility into a first AC power to supply to the utility power source or the AC power source, and the DC-AC inverter circuit converts the DC power stored in the electric energy storage facility into a second AC power to supply to the second AC port;

or, when the utility power source or the AC power source is out of tolerance or is in failure, the AC switch is selectively switched off as an open state such that the bidirectional power conversion circuit converts the DC power stored in the electric energy storage facility into the first AC power to supply to the first AC port, and the DC-AC inverter circuit converts the DC power stored in the electric energy storage facility into the second AC power to the second AC port.

In a separate aspect of the present invention, the electric energy storage facility further includes at least one additional DC-AC inverter circuit to connect with a third AC port for expanding a number of the AC ports of the multi-port energy storage system.

In a further separate aspect of the present invention, the first AC port supplies a utility level of power quality while the second AC port supplies clean and stable power quality whose voltages, frequencies or waveforms are different from those of the utility level of power quality.

In yet a further separate aspect of the present invention, the first AC port connects with a first load.

In yet a further separate aspect of the present invention, the second AC port connects with a second load.

The multi-port energy storage system in accordance with another aspect of the present invention includes:

a bidirectional power conversion circuit including an AC side and a DC side;

a first DC-AC inverter circuit including a DC side and an AC side;

a second DC-AC inverter circuit including a DC side and an AC side;

an electric energy storage facility connecting between the DC side of the bidirectional power conversion circuit and the DC side of the first DC-AC inverter circuit, with the electric energy storage facility further connecting between the DC side of the bidirectional power conversion circuit and the DC side of the second DC-AC inverter circuit;

a first AC port connecting with the AC side of the bidirectional power conversion circuit;

a second AC port connecting with the AC side of the DC-AC inverter circuit;

a third AC port connecting with the AC side of the DC-AC inverter circuit; and an AC switch including a first side connecting with a utility power source or an AC power source and a second side connecting with the AC side of the bidirectional power conversion circuit;

wherein when the utility power source or the AC power source stays within a normal tolerance, the AC switch is selectively switched on as a close state allowing the utility power source or the AC power source to supply an AC power to the first AC port and further to directly supply the AC power to the AC side of the bidirectional power conversion circuit, such that the bidirectional power conversion circuit converts the AC power of the utility power source or the AC power source into a DC power to charge the electric energy storage facility, and the DC power is further converted into a first AC power by the first DC-AC inverter circuit to supply to the second AC port, or the DC power is further converted into a second AC power by the second DC-AC inverter circuit to supply to the third AC port;

or, when the utility power source or the AC power source stays within the normal tolerance, the AC switch is selectively switched on a close state allowing the utility power source or the AC power source to directly supply the AC power to the first AC port while the bidirectional power conversion circuit converts the DC power stored in the electric energy storage facility into a third AC power to supply to the utility power source or the AC power source, and the first DC-AC inverter circuit converts the DC power stored in the electric energy storage facility into the first AC power to supply to the second AC port, or alternatively the second DC-AC inverter circuit converts the DC power stored in the electric energy storage facility into the second AC power to supply to the third AC port;

or, when the utility power source or the AC power source is out of tolerance or failure, the AC switch is selectively switched off as an open state, such that the bidirectional power conversion circuit converts the DC power stored in the electric energy storage facility into the third AC power to supply to the first AC port, and the first DC-AC inverter circuit converts the DC power stored in the electric energy storage facility into the first AC power to the second AC port, or alternatively the second DC-AC inverter circuit converts the DC power stored in the electric energy storage facility into the second AC power to supply to the third AC port.

In a separate aspect of the present invention, the electric energy storage facility further includes at least one additional DC-AC inverter circuit to connect with a fourth AC port for expanding a number of the AC ports of the multi-port energy storage system.

In a further separate aspect of the present invention, the first AC port supplies a utility level of power quality while the second AC port and the third AC port supply clean and stable power quality whose voltages, frequencies or waveforms are different from those of the utility level of power quality.

In yet a further separate aspect of the present invention, the first AC port connects with a first load.

In yet a further separate aspect of the present invention, the second AC port connects with a second load.

In yet a further separate aspect of the present invention, the third AC port connects with a third load.

The control method for a multi-port energy storage system in accordance with an aspect of the present invention includes:

connecting an energy storage system to a utility power source or an AC power source, with the energy storage system including a bidirectional power conversion circuit, a DC-AC inverter circuit, an electric energy storage facility, a first AC port, a second AC port and an AC switch;

when the utility power source or the AC power source stays within a normal tolerance, selectively switching on the AC switch as a close state for allowing the utility power source or the AC power source to supply an AC power to the first AC port and further to directly supply the AC power to an AC side of the bidirectional power conversion circuit, such that the bidirectional power conversion circuit converts the AC power of the utility power source or the AC power source into a DC power to charge the electric energy storage facility and the DC power is further converted into an AC power by the DC-AC inverter circuit to supply to the second AC port;

or, when the utility power source or the AC power source stays within the normal tolerance, selectively switching on the AC switch as a close state for allowing the utility power source or the AC power source to directly supply the AC power to the first AC port while the bidirectional power conversion circuit converts the DC power stored in the electric energy storage facility into a first AC power to supply to the utility power source or the AC power source and the DC-AC inverter circuit converts the DC power stored in the electric energy storage facility into a second AC power to supply to the second AC port;

or, when the utility power source or the AC power source is out of tolerance or is in failure, selectively switching off the AC switch as an open state such that the bidirectional power conversion circuit converts the DC power stored in the electric energy storage facility into the first AC power to supply to the first AC port and the DC-AC inverter circuit converts the DC power stored in the electric energy storage facility into the second AC power to the second AC port.

In a separate aspect of the present invention, the first AC port supplies a utility level of power quality while the second AC port supplies clean and stable power quality whose voltages, frequencies or waveforms are different from those of the utility level of power quality.

In a further separate aspect of the present invention, the first AC port connects with a first load.

In yet a further separate aspect of the present invention, the second AC port connects with a second load.

In yet a further separate aspect of the present invention, the AC switch connects between the utility power source or the AC power source and the AC side of the bidirectional power conversion circuit.

In yet a further separate aspect of the present invention, the electric energy storage facility further includes at least one additional DC-AC inverter circuit to connect with a third AC port for expanding a number of the AC ports of the multi-port energy storage system.

In yet a further separate aspect of the present invention, the third AC port supplies clean and stable power quality whose voltages, frequencies or waveforms are different from those of the utility level of power quality.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that a multi-port energy storage system and a control method thereof in accordance with the preferred embodiment of the present invention can be applicable to various energy storage systems (ESS) having two ports, three ports or multiple ports. By way of example, the energy storage system includes a residential ESS, a community ESS and a commercial ESS, which is not limitative of the present invention.

Figure 4A:
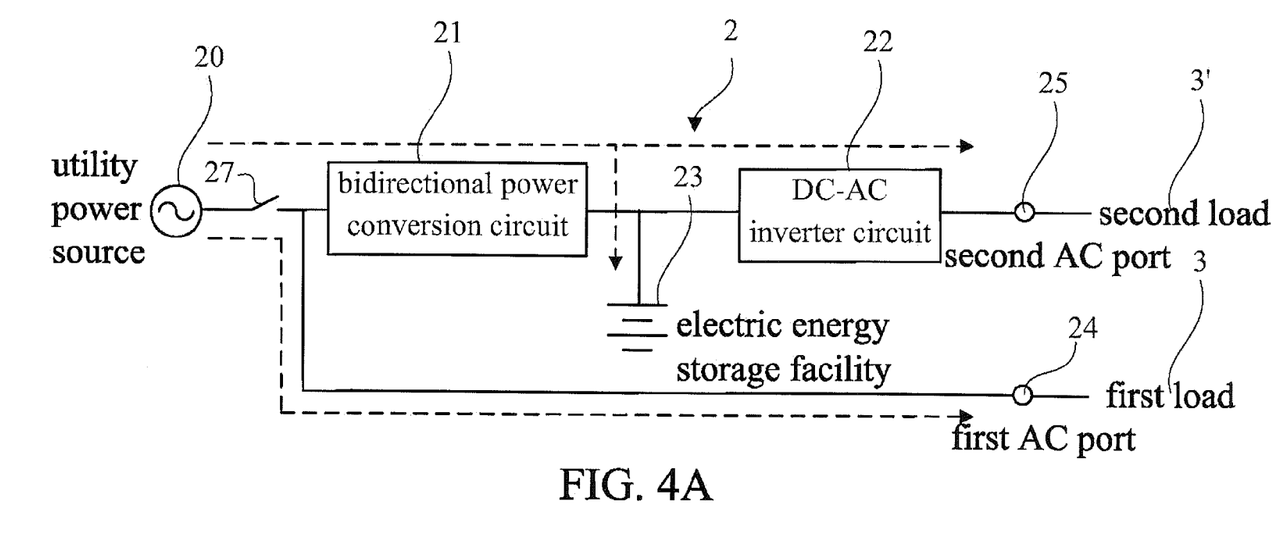
FIG. 4A is a schematic block diagram of a multi-port energy storage system and a control method thereof in accordance with a first preferred embodiment of the present invention operated in a power storage state when the utility power stays within its normal tolerance.

FIG. 4A shows a schematic block diagram of a multi-port energy storage system and a control method thereof in accordance with a first preferred embodiment of the present invention operated in a power storage state when the utility power stays within its normal tolerance. Referring now to FIG. 4A, the multi-port energy storage system 2 of the first preferred embodiment connects with a utility power source 20 (or AC power source) to store the power supplied from the utility power source 20 in the multi-port energy storage system 2, or alternatively to supply the power stored in the multi-port energy storage system 2 to the utility power source 20. The multi-port energy storage system 2 further connects with a first load 3 and a second load 3'. In the first preferred embodiment, the AC power source is selected from various renewable energy sources, for example, including solar power, wind power, fuel cells or other renewable energies.

Still referring to FIG. 4A, the multi-port energy storage system 2 is a double-port energy storage system including a bidirectional power conversion circuit (or AC-DC bidirectional power converter) 21, a DC-AC inverter circuit (or DC-AC inverter) 22, an electric energy storage facility 23, a first AC port 24, a second AC port 25 and an AC switch 27. The bidirectional power conversion circuit 21 has an AC side (left side) and a DC side (right side). The DC-AC inverter circuit 22 has a DC side (left side) and an AC side (right side). The electric energy storage facility 23 connects between the DC side of the bidirectional power conversion circuit 21 and the DC side of the DC-AC inverter circuit 22.

Still referring to FIG. 4A, a source of the electric energy storage facility 23 is selected from various renewable energy sources, for example, including solar power, wind power, fuel cells or other renewable energies. The AC switch 27 is selected from various mechanical devices including a relay and a magnetic contactor or various solid-state devices including a set of anti-parallel thyristors or insulated gate bipolar transistors (IGBTs).

With continued reference to FIG. 4A, the first AC port 24 connects between the AC side of the bidirectional power conversion circuit 21 and the AC switch 27. The first AC port 24 further connects with the first load 3 to supply the power to the first load 3 via the first AC port 24. Correspondingly, the second AC port 25 connects with the AC side of the DC-AC inverter circuit 22 and further connects with the second load 3' to supply the power to the second load 3' via the second AC port 25. Accordingly, the multi-port energy storage system 2 supplies various levels (or classifications) of power quality via the first AC port 24 and the second AC port 25.

With continued reference to FIG. 4A, the AC switch 27 has a first side and a second side. The first side of the AC switch 27 connects with the utility power source 20 (or AC power source), while the second side of the AC switch 27 connects with the AC side of the bidirectional power conversion circuit 21. Accordingly, the AC switch 27 is selectively operated to connect between the utility power source 20 and the multi-port energy storage system 2 or to disconnect therebetween.

With continued reference to FIG. 4A, the control method of the multi-port energy storage system 2 includes a first operational state: when the utility power source 20 stays within its normal tolerance and is in the off-peak time period, for example, for an electric energy rate, the AC switch 27 is selectively switched on as a close state allowing the utility power source 20 to directly supply an AC power to the first AC port 24 and the first load 3, as best shown in the lower dotted line and arrow of FIG. 4A. Consequently, the multi-port energy storage system 2 supplies conditions (e.g. voltage, frequency or waveform) of power quality which depend on those of the utility power source 20 via the first AC port 24. Namely, the multi-port energy storage system 2 supplies the utility power quality or the like to the first load 3. Additionally, switching on the AC switch 27 further allows the utility power source 20 to directly supply the AC power to the AC side of the bidirectional power conversion circuit 21, such that the bidirectional power conversion circuit 21 converts the AC power of the utility power source 20 into a DC power to charge the electric energy storage facility 23, as best shown in the left upper dotted line and arrow of FIG. 4A. Furthermore, the bidirectional power conversion circuit 21 converts the AC power of the utility power source 20 into the DC power, and, then, the DC power is further converted into an AC power by the DC-AC inverter circuit 22 to supply to the second AC port 25 and the second load 3', as best shown in the right upper dotted line and arrow of FIG. 4A. Consequently, the second AC port 25 of the multi-port energy storage system 2 supplies an independent power quality from the utility power source 20. Namely, the multi-port energy storage system 2 supplies the second load 3' clean and stable power quality whose voltages, frequencies or waveforms are different from those of the utility level of power quality.

Figure 4B:
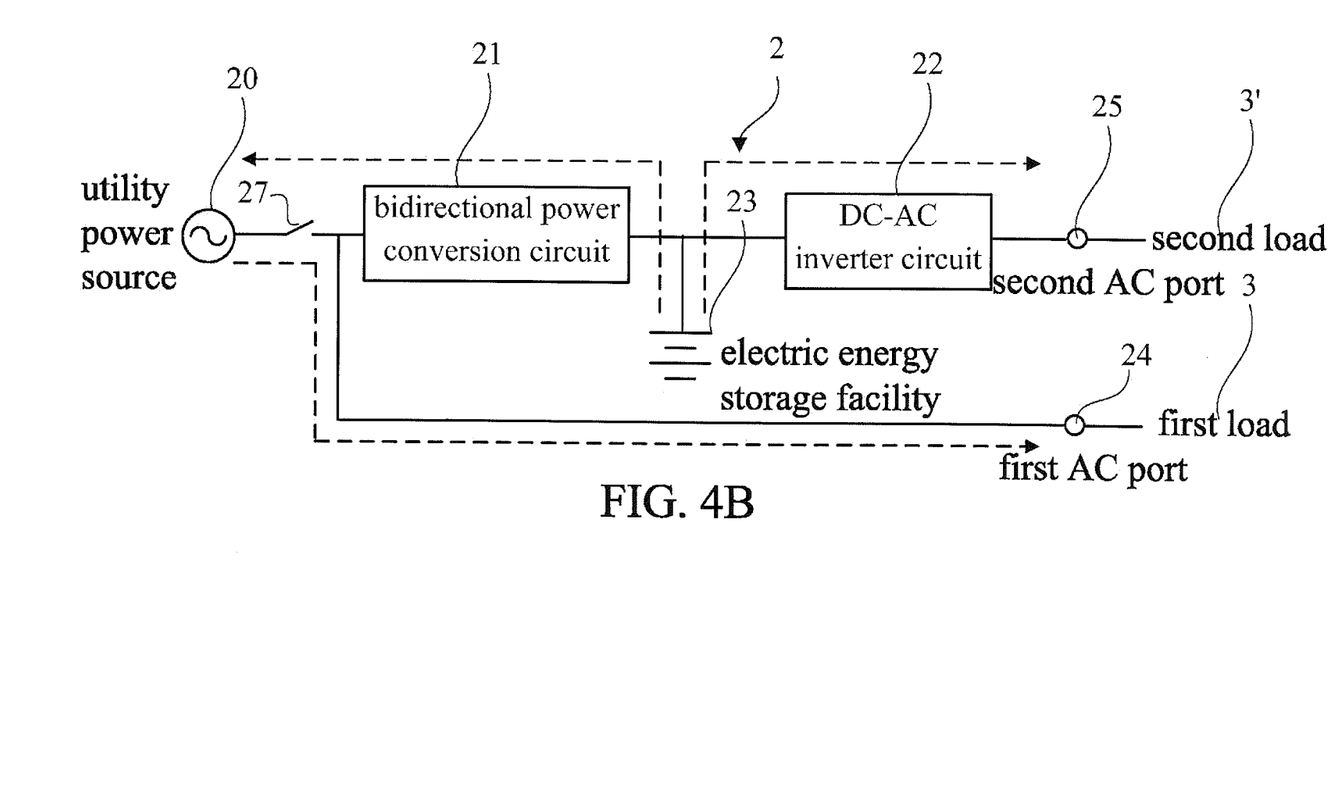
FIG. 4B is a schematic block diagram of the multi-port energy storage system and the control method thereof in accordance with the first preferred embodiment of the present invention operated in a power release state when the utility power stays within its normal tolerance.

FIG. 4B shows a schematic block diagram corresponding to that of FIG. 4A, explaining the multi-port energy storage system and the control method thereof in accordance with the first preferred embodiment of the present invention operated in a power release state when the utility power stays within its normal tolerance. Referring now to FIG. 4B, the control method of the multi-port energy storage system 2 includes a second operational state: when the utility power source 20 stays within its normal tolerance but is in a peak time period, for example, for an electric energy rate, the AC switch 27 is selectively switched on as a close state allowing the utility power source 20 to directly supply the AC power to the first AC port 24 and the first load 3, as best shown in the lower dotted line and arrow of FIG. 4B. Consequently, the multi-port energy storage system 2 still supplies conditions (e.g. voltage, frequency or waveform) of power quality which depend on those of the utility power source 20 via the first AC port 24. Additionally, the bidirectional power conversion circuit 21 converts the DC power stored in the electric energy storage facility 23 into a first AC power to supply to the utility power source 20, as best shown in the left upper dotted line and arrow of FIG. 4B. Furthermore, the DC-AC inverter circuit 22 also converts the DC power stored in the electric energy storage facility 23 into a second AC power to supply to the second AC port 25 and the second load 3', as best shown in the right upper dotted line and arrow of FIG. 4B.

Figure 5:
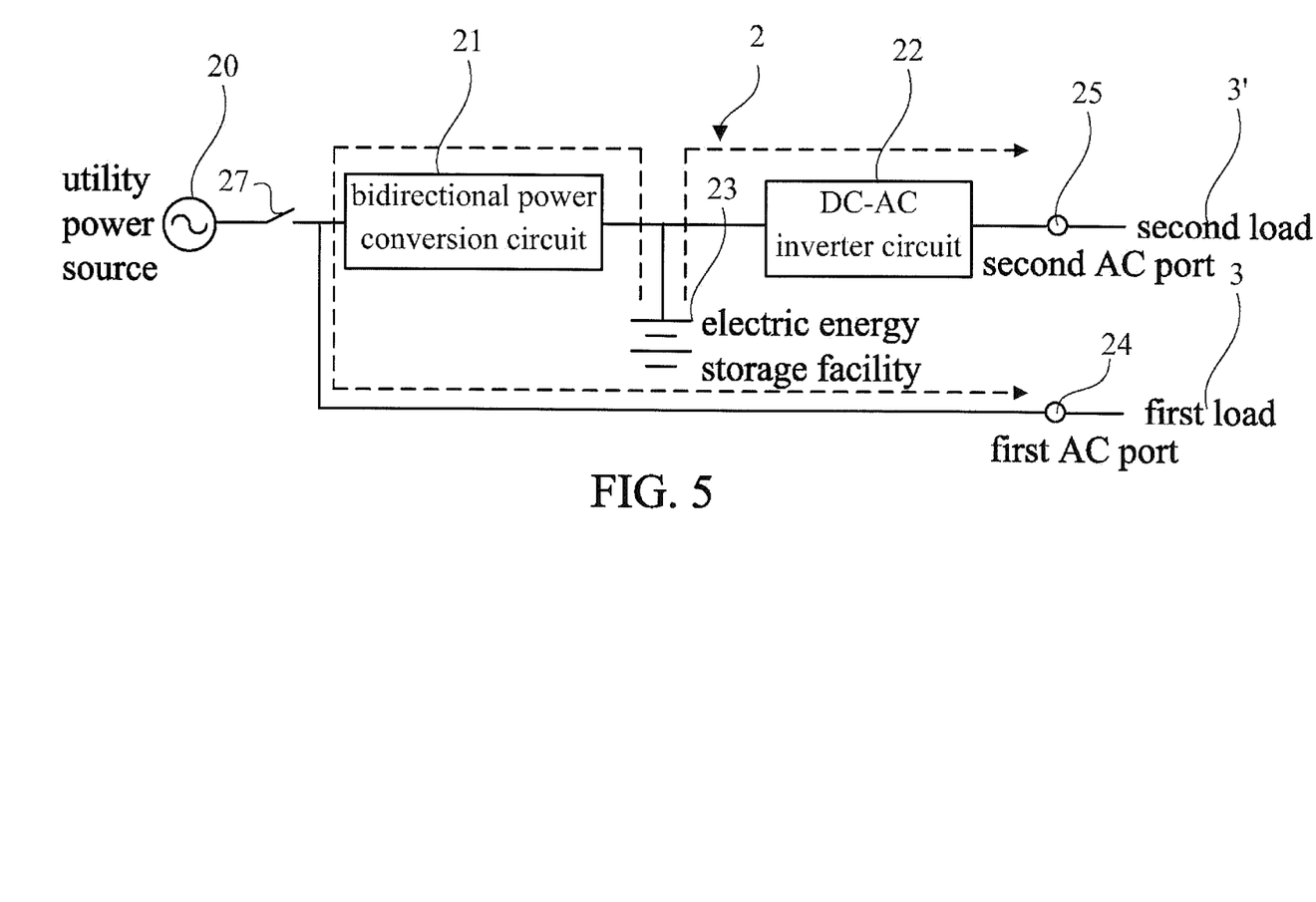
FIG. 5 is a schematic block diagram of the multi-port energy storage system and the control method thereof in accordance with the first preferred embodiment of the present invention operated in another power release state when the utility power is out of tolerance or is in failure.

FIG. 5 shows a schematic block diagram corresponding to those of FIGS. 4A and 4B, explaining the multi-port energy storage system and the control method thereof in accordance with the first preferred embodiment of the present invention operated in another power release state when the utility power is out of tolerance or is in failure. Referring now to FIG. 5, the control method of the multi-port energy storage system 2 includes a third operational state: when the utility power source 20 is out of tolerance or is in failure, the AC switch 27 is selectively switched off as an open state, such that the bidirectional power conversion circuit 21 converts the DC power stored in the electric energy storage facility 23 into the first AC power to supply to the first AC port 24 and the first load 3, as best shown in the left dotted line and arrow of FIG. 5. Furthermore, the DC-AC inverter circuit 22 also converts the DC power stored in the electric energy storage facility 23 into the second AC power to the second AC port 25 and the second load 3', as best shown in the right upper dotted line and arrow of FIG. 5.

Figure 6A:
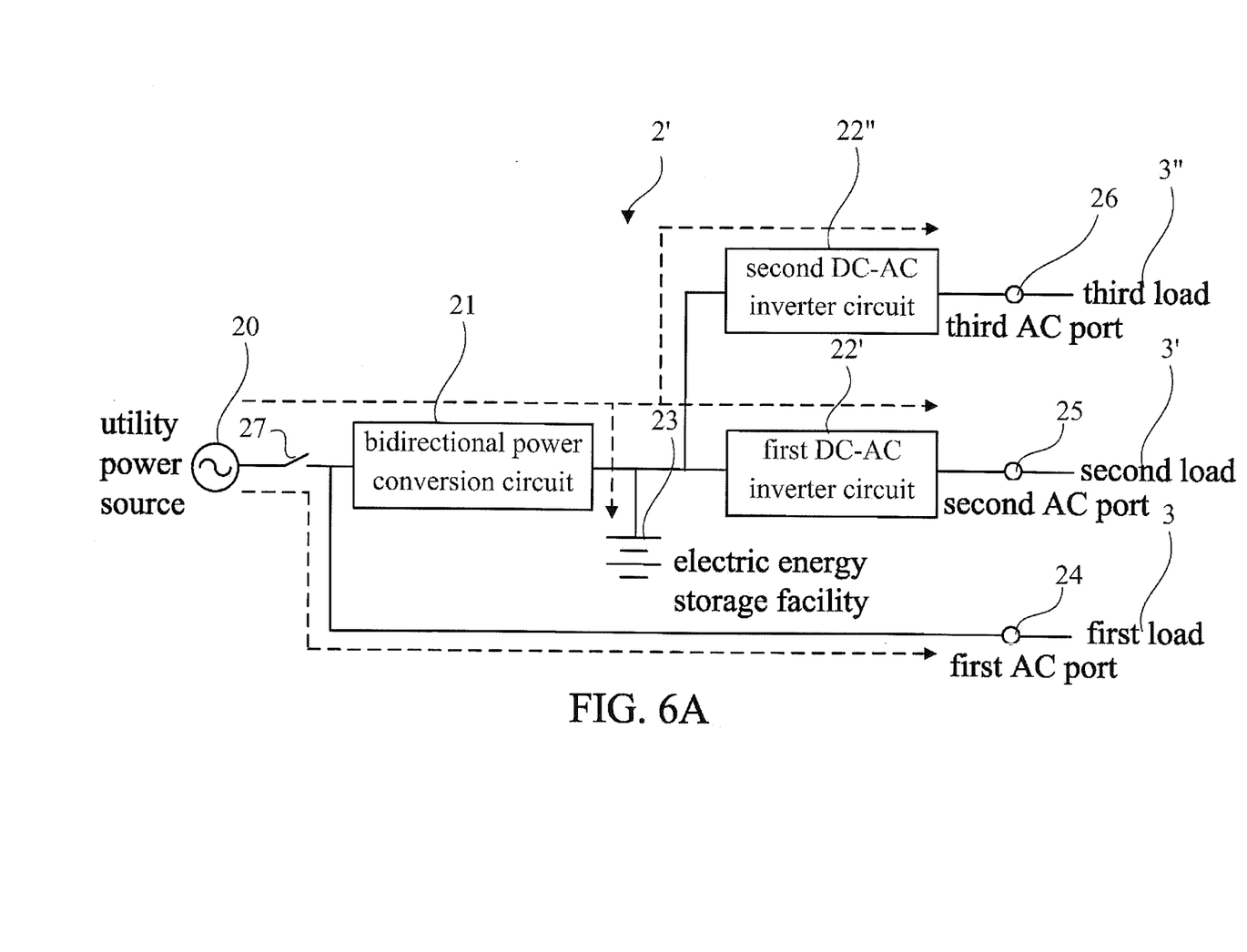
FIG. 6A is a schematic block diagram of the multi-port energy storage system and the control method thereof in accordance with a second preferred embodiment of the present invention operated in the power storage state when the utility power stays within its normal tolerance.

FIG. 6A shows a schematic block diagram, which is similar to that of FIG. 4A, explaining the multi-port energy storage system 2' and the control method thereof in accordance with a second preferred embodiment of the present invention operated in the power storage state when the utility power stays within its normal tolerance. Referring now to FIG. 6A, in comparison with the first preferred embodiment, the multi-port energy storage system 2' of the second preferred embodiment is a triple-port energy storage system including a bidirectional power conversion circuit 21, a first DC-AC inverter circuit 22', a second DC-AC inverter circuit 22", an electric energy storage facility 23, a first AC port 24, a second AC port 25, a third AC port 26 and an AC switch 27.

Still referring to FIG. 6A, the control method of the multi-port energy storage system 2' includes a first operational state: when the utility power source 20 stays within its normal tolerance and is in the off-peak time period, for example, for an electric energy rate, the AC switch 27 is selectively switched on as a close state allowing the utility power source 20 to directly supply an AC power to the first AC port 24 and the first load 3, as best shown in lower dotted line and arrow of FIG. 6A. Additionally, switching on the AC switch 27 further allows the utility power source 20 to directly supply the AC power to the AC side of the bidirectional power conversion circuit 21 such that the bidirectional power conversion circuit 21 converts the AC power of the utility power source 20 into the DC power to charge the electric energy storage facility 23, as best shown in the left upper dotted line and arrow of FIG. 6A. Furthermore, the bidirectional power conversion circuit 21 converts the AC power of the utility power source 20 into the DC power, and, then, the DC power is further converted into a first AC power by the first DC-AC inverter circuit 22' to supply to the second AC port 25 and the second load 3', as best shown in the right middle dotted line and arrow of FIG. 6A. Alternatively, the DC power is selectively converted into a second AC power by the second DC-AC inverter circuit 22" to supply to the third AC port 26 and the third load 3", as best shown in the right upper dotted line and arrow of FIG. 6A.

Figure 6B:
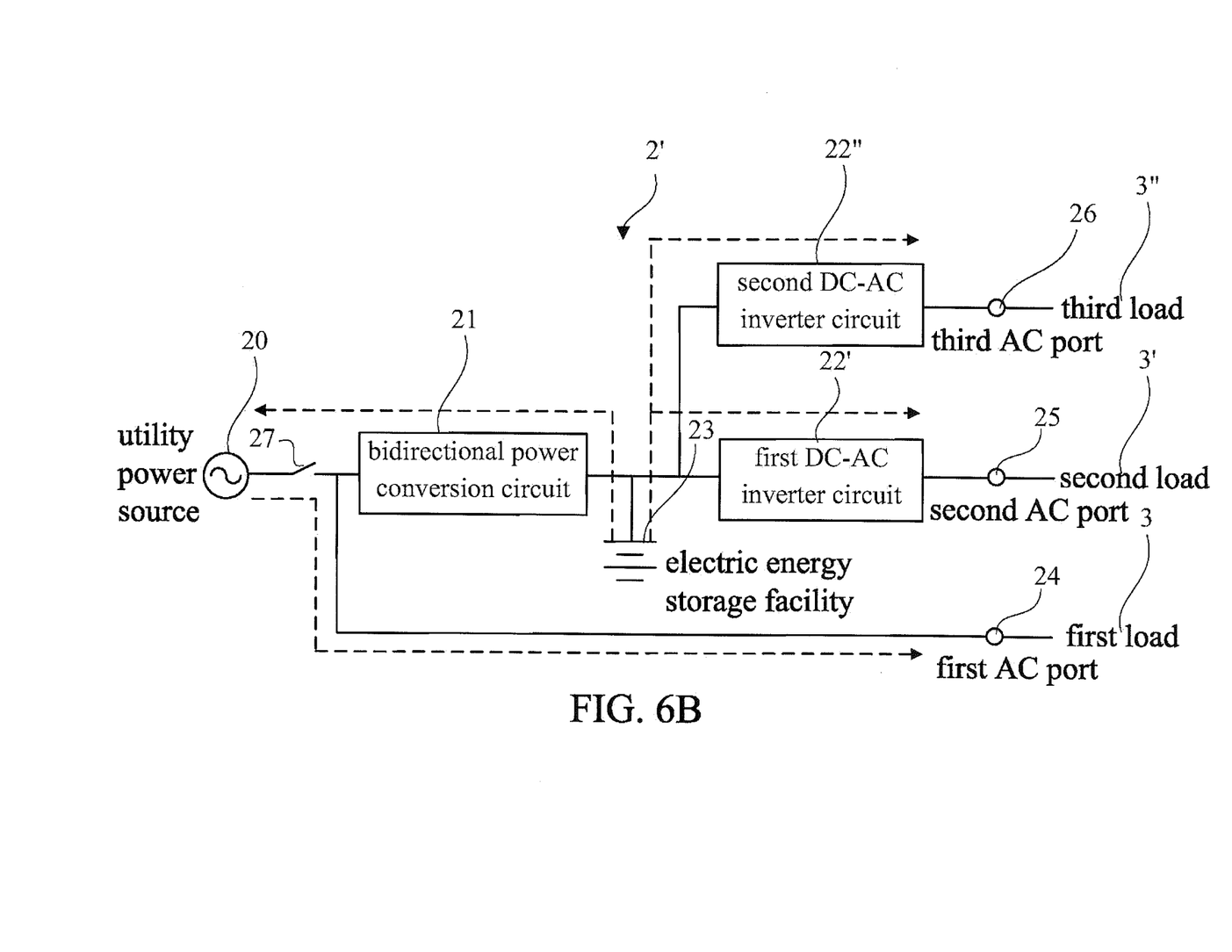
FIG. 6B is a schematic block diagram of the multi-port energy storage system and the control method thereof in accordance with the second preferred embodiment of the present invention operated in the power release state when the utility power stays within its normal tolerance.

FIG. 6B shows a schematic block diagram corresponding to that of FIG. 6A, explaining the multi-port energy storage system 2' and the control method thereof in accordance with the second preferred embodiment of the present invention operated in the power release state when the utility power stays within its normal tolerance. Referring now to FIG. 6B, the control method of the multi-port energy storage system 2' includes a second operational state: when the utility power source 20 stays within its normal tolerance but is in the peak time period, for example, for an electric energy rate, the AC switch 27 is selectively switched on as a close state allowing the utility power source 20 to directly supply the AC power to the first AC port 24 and the first load 3, as best shown in the lower dotted line and arrow of FIG. 6B. Additionally, the bidirectional power conversion circuit 21 converts the DC power stored in the electric energy storage facility 23 into a third AC power to supply to the utility power source 20, as best shown in the left upper dotted line and arrow of FIG. 6B. Furthermore, the first DC-AC inverter circuit 22' also converts the DC power stored in the electric energy storage facility 23 into the first AC power to supply to the second AC port 25 and the second load 3', as best shown in the right middle dotted line and arrow of FIG. 6B. Alternatively, the second DC-AC inverter circuit 22" also converts the DC power stored in the electric energy storage facility 23 into the second AC power to supply to the third AC port 26 and the third load 3", as best shown in the right upper dotted line and arrow of FIG. 6B.

Figure 7:
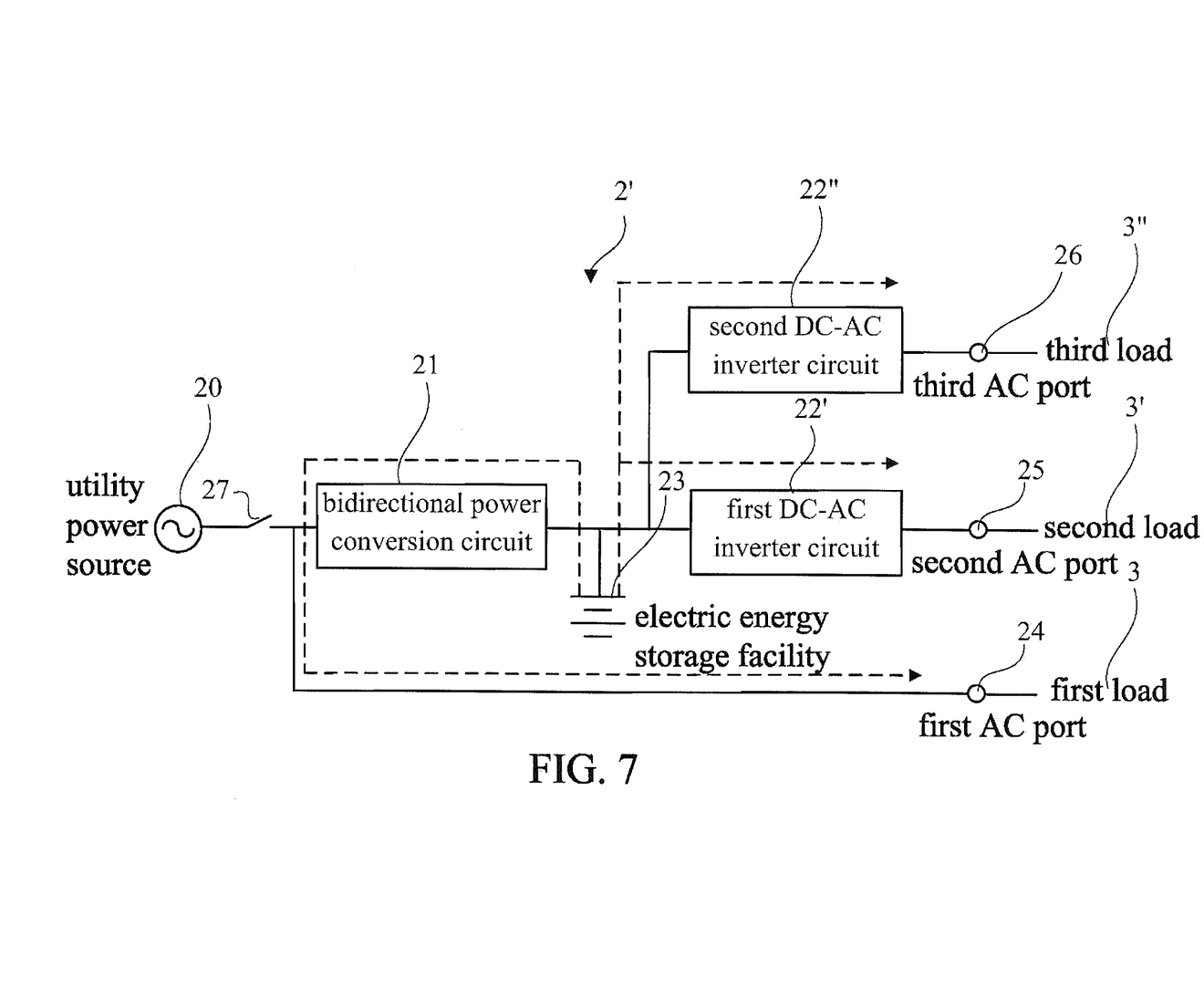
FIG. 7 is a schematic block diagram of the multi-port energy storage system and the control method thereof in accordance with the second preferred embodiment of the present invention applied to operate in another power release state when the utility power is out of tolerance or is in failure.

FIG. 7 shows a schematic block diagram corresponding to those of FIGS. 6A and 6B, explaining the multi-port energy storage system 2' and the control method thereof in accordance with the second preferred embodiment of the present invention applied to operate in another power release state when the utility power is out of tolerance or is in failure. Referring now to FIG. 7, the control method of the multi-port energy storage system 2' includes a third operational state: when the utility power source 20 is out of tolerance or is in failure, the AC switch 27 is selectively switched off as an open state, such that the bidirectional power conversion circuit 21 converts the DC power stored in the electric energy storage facility 23 into the third AC power to supply to the first AC port 24 and the first load 3, as best shown in the left dotted line and arrow of FIG. 7. Furthermore, the first DC-AC inverter circuit 22' also converts the DC power stored in the electric energy storage facility 23 into the first AC power to the second AC port 25 and the second load 3', as best shown in the right middle dotted line and arrow of FIG. 7. Alternatively, the second DC-AC inverter circuit 22" also converts the DC power stored in the electric energy storage facility 23 into the second AC power to the third AC port 26 and the third load 3", as best shown in the right upper dotted line and arrow of FIG. 7.

Although the invention has been described in detail with reference to its presently preferred embodiments, it will be understood by one of ordinary skill in the art that various modifications can be made without departing from the spirit and the scope of the invention, as set forth in the appended claims.

What is claimed is:

1. A multi-port energy storage system comprising:
a bidirectional power conversion circuit formed with an AC side and a DC side;
a DC-AC inverter circuit formed with a DC side and an AC side;
an electric energy storage facility connecting between the DC side of the bidirectional power conversion circuit and the DC side of the DC-AC inverter circuit;
a first AC port connecting with the AC side of the bidirectional power conversion circuit;
a second AC port connecting with the AC side of the DC-AC inverter circuit; and
an AC switch formed with a first side connecting with a utility power source or an AC power source and a second side connecting with the AC side of the bidirectional power conversion circuit, with the bidirectional power conversion circuit switching on the AC switch to connect the electric energy storage facility, the first AC port and the second AC port to the utility power source or the AC power source, with the bidirectional power conversion circuit switching off the AC switch to disconnect the electric energy storage facility, the first AC port and the second AC port from the utility power source or the AC power source;
wherein when the utility power source or the AC power source stays within a normal tolerance, the AC switch is selectively switched on as a close state allowing the utility power source or the AC power source to directly supply an AC power to the first AC port and further to directly supply the AC power to the AC side of the bidirectional power conversion circuit, wherein the bidirectional power conversion circuit converts the AC power of the utility power source or the AC power source into a DC power to charge the electric energy storage facility and the DC power is further converted into an AC power by the DC-AC inverter circuit to supply to the second AC port;
wherein when the utility power source or the AC power source stays within the normal tolerance, the AC switch is selectively switched on as a close state allowing the utility power source or the AC power source to directly supply the AC power to the first AC port while the bidirectional power conversion circuit converts the DC power stored in the electric energy storage facility into a first AC power to supply to the utility power source or the AC power source and the DC-AC inverter circuit converts the DC power stored in the electric energy storage facility into a second AC power to supply to the second AC port; and
wherein when the utility power source or the AC power source is out of tolerance is in or failure, the AC switch is selectively switched off as an open state, wherein the bidirectional power conversion circuit converts the DC power stored in the electric energy storage facility into the first AC power to supply to the first AC port and the DC-AC inverter circuit converts the DC power stored in the electric energy storage facility into the second AC power to the second AC port.

2. The multi-port energy storage system as defined in claim 1, wherein the electric energy storage facility further comprises at least one additional DC-AC inverter circuit to connect with a third AC port.

3. The multi-port energy storage system as defined in claim 1, wherein the first AC port supplies a utility level of power quality while the second AC port supplies clean and stable power quality whose voltages, frequencies or waveforms are different from those of the utility level of power quality.

4. The multi-port energy storage system as defined in claim 1, wherein the first AC port connects with a first load while the second AC port connects with a second load.

5. The multi-port energy storage system as defined in claim 1, wherein a source of the AC power source or the electric energy storage facility comprises solar power, wind power or fuel cells.

6. The multi-port energy storage system as defined in claim 1, wherein the AC switch is selected from a mechanical device comprising a relay, a magnetic contactor, or a solid-state device comprising a set of anti-parallel thyristors or insulated gate bipolar transistors.

7. A multi-port energy storage system comprising:
a bidirectional power conversion circuit formed with an AC side and a DC side;
a first DC-AC inverter circuit formed with a DC side and an AC side;
a second DC-AC inverter circuit formed with a DC side and an AC side;
an electric energy storage facility connecting between the DC side of the bidirectional power conversion circuit and the DC side of the first DC-AC inverter circuit and the electric energy storage facility further connecting between the DC side of the bidirectional power conversion circuit and the DC side of the second DC-AC inverter circuit;
a first AC port connecting with the AC side of the bidirectional power conversion circuit;
a second AC port connecting with the AC side of the first DC-AC inverter circuit;
a third AC port connecting with the AC side of the second DC-AC inverter circuit; and
an AC switch formed with a first side connecting with a utility power source or an AC power source and a second side connecting with the AC side of the bidirectional power conversion circuit, with the bidirectional power conversion circuit switching on the AC switch to connect the electric energy storage facility, the first AC port, the second AC port and the third AC port to the utility power source or the AC power source, with the bidirectional power conversion circuit switching off the AC switch to disconnect the electric energy storage facility, the first AC port, the second AC port and the third AC port from the utility power source or the AC power source;
wherein when the utility power source or the AC power source stays within a normal tolerance, the AC switch is selectively switched on as a close state allowing the utility power source or the AC power source to supply an AC power to the first AC port and further to directly supply the AC power to the AC side of the bidirectional power conversion circuit, wherein the bidirectional power conversion circuit converts the AC power of the utility power source or the AC power source into a DC power to charge the electric energy storage facility and the DC power is further converted into a first AC power by the first DC-AC inverter circuit to supply to the second AC port or the DC power is further converted into a second AC power by the second DC-AC inverter circuit to supply to the third AC port;

wherein when the utility power source or the AC power source stays within the normal tolerance, the AC switch is selectively switched on as a close state allowing the utility power source or the AC power source to directly supply the AC power to the first AC port while the bidirectional power conversion circuit converts the DC power stored in the electric energy storage facility into a third AC power to supply to the utility power source or the AC power source, and the first DC-AC inverter circuit converts the DC power stored in the electric energy storage facility into a first AC power to supply to the second AC port, or alternatively the second DC-AC inverter circuit converts the DC power stored in the electric energy storage facility into a second AC power to supply to the third AC port; and wherein when the utility power source or the AC power source is out of tolerance or is in failure, the AC switch is selectively switched off as an open state, wherein the bidirectional power conversion circuit converts the DC power stored in the electric energy storage facility into the third AC power to supply to the first AC port, and the first DC-AC inverter circuit converts the DC power stored in the electric energy storage facility into the first AC power to the second AC port, or alternatively the second DC-AC inverter circuit converts the DC power stored in the electric energy storage facility into the second AC power to supply to the third AC port.

8. The multi-port energy storage system as defined in claim 7, wherein the electric energy storage facility further comprises at least one additional DC-AC inverter circuit to connect with a fourth AC port.

9. The multi-port energy storage system as defined in claim 7, wherein the first AC port supplies a utility level of power quality while the second AC port and the third AC port supply clean and stable power quality whose voltages, frequencies or waveforms are different from those of the utility level of power quality.

10. The multi-port energy storage system as defined in claim 7, wherein the first AC port connects with a first load, the second AC port connects with a second load and the third AC port connects with a third load.

11. The multi-port energy storage system as defined in claim 7, wherein the AC switch is selected from a mechanical device comprising a relay, a magnetic contactor, or a solid-state device comprising a set of anti-parallel thyristors or insulated gate bipolar transistors.

12. A control method for a multi-port energy storage system comprising:
connecting an energy storage system to a utility power source or an AC power source, with the energy storage system comprising a bidirectional power conversion circuit, a DC-AC inverter circuit, an electric energy storage facility, a first AC port, a second AC port and an AC switch; and
connecting a first side of the AC switch to the utility power source or the AC power source, with further connecting a second side of the AC switch to the AC side of the bidirectional power conversion circuit, with switching on the AC switch to connect the electric energy storage facility, the first AC port and the second AC port to the utility power source or the AC power source, with switching off the AC switch to disconnect the electric energy storage facility, the first AC port and the second AC port from the utility power source or the AC power source;
wherein when the utility power source or the AC power source stays within a normal tolerance, selectively switching on the AC switch as a close state for allowing the utility power source or the AC power source to supply an AC power to the first AC port and further to directly supply the AC power to an AC side of the bidirectional power conversion circuit, with the bidirectional power conversion circuit converting the AC power of the utility power source or the AC power source into a DC power to charge the electric energy storage facility and converting the DC power into an AC power by the DC-AC inverter circuit to supply to the second AC port;

wherein when the utility power source or the AC power source stays within the normal tolerance, selectively switching on the AC switch as a close state for allowing the utility power source or the AC power source to directly supply the AC power to the first AC port while the bidirectional power conversion circuit converts the DC power stored in the electric energy storage facility into a first AC power to supply to the utility power source or the AC power source and with the DC-AC inverter circuit converting the DC power stored in the electric energy storage facility into a second AC power to supply to the second AC port; and wherein when the utility power source or the AC power source is out of tolerance or failure, selectively switching off the AC switch as an open state, with the bidirectional power conversion circuit converting the DC power stored in the electric energy storage facility into the first AC power to supply to the first AC port and with the DC-AC inverter circuit converting the DC power stored in the electric energy storage facility into the second AC power to the second AC port.

13. The control method for the multi-port energy storage system as defined in claim 12, wherein the first AC port supplies a utility level of power quality while the second AC port supplies clean and stable power quality whose voltages, frequencies or waveforms are different from those of the utility level of power quality.

14. The control method for the multi-port energy storage system as defined in claim 12, wherein the first AC port connects with a first load while the second AC port connects with a second load.

15. The control method for the multi-port energy storage system as defined in claim 12, wherein the AC switch connects between utility power source or the AC power source and the AC side of the bidirectional power conversion circuit.

16. The control method for the multi-port energy storage system as defined in claim 12, further comprising connecting at least one additional DC-AC inverter circuit with a third AC port.

17. The control method for the multi-port energy storage system as defined in claim 16, wherein the third AC port connects with a third load.

18. The control method for the multi-port energy storage system as defined in claim 16, wherein the third AC port supplies clean and stable power quality whose voltages, frequencies or waveforms are different from those of the utility level of power quality.

19. The control method for the multi-port energy storage system as defined in claim 12, wherein a source of the AC power source or the electric energy storage facility comprises solar power, wind power or fuel cells.

20. The control method for the multi-port energy storage system as defined in claim 12, wherein the AC switch is selected from a mechanical device comprising a relay, a magnetic contactor, or a solid-state device comprising a set of anti-parallel thyristors or insulated gate bipolar transistors.

* * * * *